US00RE49810E

(19) United States
(12) Reissued Patent
Stetzer

(10) Patent Number: US RE49,810 E
(45) Date of Reissued Patent: *Jan. 23, 2024

(54) THICKENER COMPOSITION, THICKENED NUTRITIVE PRODUCTS, METHODS FOR PREPARING THICKENED NUTRITIVE PRODUCTS, AND METHODS FOR PROVIDING NUTRITION

(71) Applicant: Kent Precision Foods Group, Inc., Muscatine, IA (US)

(72) Inventor: Douglas A. Stetzer, Superior, WI (US)

(73) Assignee: Kent Precision Foods Group, Inc., Muscatine, IA (US)

( * ) Notice: This patent is subject to a terminal disclaimer.

(21) Appl. No.: 17/235,699

(22) Filed: Apr. 20, 2021

Related U.S. Patent Documents

Reissue of:
(64) Patent No.: 9,101,156
Issued: Aug. 11, 2015
Appl. No.: 14/204,420
Filed: Mar. 11, 2014

U.S. Applications:
(63) Continuation of application No. 16/388,160, filed on Apr. 18, 2019, now Pat. No. Re. 48,607, which is a continuation of application No. 15/343,756, filed on Nov. 4, 2016, now Pat. No. Re. 47,448, which is an application for the reissue of Pat. No. 9,101,156.

(60) Provisional application No. 61/793,628, filed on Mar. 15, 2013.

(51) Int. Cl.

| | |
|---|---|
| ***A23L 1/054*** | (2006.01) |
| ***A23L 1/29*** | (2006.01) |
| ***A23C 9/20*** | (2006.01) |
| ***A23L 1/302*** | (2006.01) |
| ***A23L 1/304*** | (2006.01) |
| ***A23L 29/269*** | (2016.01) |
| ***A23L 33/16*** | (2016.01) |
| ***A23L 33/15*** | (2016.01) |
| ***A23L 33/00*** | (2016.01) |

(52) U.S. Cl.
CPC ..... *A23C 9/206* (2013.01); *A23L 29/27* (2016.08); *A23L 33/15* (2016.08); *A23L 33/16* (2016.08); *A23L 33/40* (2016.08)

(58) Field of Classification Search
CPC ..... A23L 29/27; A23L 33/16; A23L 33/15; A23L 33/40; A23C 9/206
See application file for complete search history.

(56) References Cited

U.S. PATENT DOCUMENTS

| | | | |
|---|---|---|---|
| 2,440,365 | A | 4/1948 | Copping et al. |
| 3,201,317 | A | 8/1965 | Miller |
| 3,750,908 | A | 8/1973 | Bauerlein et al. |
| 3,773,752 | A | 11/1973 | Buchanan et al. |
| 3,851,798 | A | 12/1974 | Miller |
| 3,949,104 | A | 4/1976 | Cheng et al. |
| 3,949,903 | A | 4/1976 | Benasutti et al. |
| 4,010,071 | A | 3/1977 | Colegrove |
| 4,042,151 | A | 8/1977 | Uttech |
| 4,105,461 | A | 8/1978 | Racciato |
| 4,107,343 | A | 8/1978 | Petricca |
| 4,132,793 | A | 1/1979 | Haber et al. |
| 4,135,979 | A | 1/1979 | Corley et al. |
| 4,229,825 | A | 10/1980 | Guidoux |
| 4,236,820 | A | 12/1980 | Walker |
| 4,252,835 | A | 2/1981 | Maerker et al. |
| 4,265,858 | A | 5/1981 | Crum et al. |
| 4,269,974 | A | 5/1981 | Wintersdorff |
| 4,299,825 | A | 11/1981 | Lee |
| 4,336,145 | A | 6/1982 | Briscoe |
| 4,394,399 | A | 7/1983 | Keyser |
| 4,427,681 | A | 1/1984 | Munshi |
| 4,430,349 | A | 2/1984 | Malone et al. |
| 4,491,483 | A | 1/1985 | Dudacek et al. |
| 4,503,084 | A | 3/1985 | Baird et al. |
| 4,563,366 | A | 1/1986 | Baird et al. |
| 4,620,932 | A | 11/1986 | Howrey |
| 4,654,086 | A | 3/1987 | Baird et al. |
| 4,670,550 | A | 6/1987 | Bleeker et al. |
| 4,671,966 | A | 6/1987 | Giddey et al. |
| 4,689,219 | A | 8/1987 | Sugden |
| 4,708,266 | A | 11/1987 | Rudick |
| 4,774,093 | A | 9/1988 | Provonchee et al. |
| 4,828,724 | A | 5/1989 | Davidson |
| 4,846,934 | A | 7/1989 | Carberry |
| 4,855,156 | A | 8/1989 | Singer et al. |
| 4,859,484 | A | 8/1989 | Bielskis et al. |
| 4,894,335 | A | 1/1990 | Peignier et al. |
| 4,938,387 | A | 7/1990 | Kervefors et al. |
| 4,980,193 | A | 12/1990 | Tuason, Jr. et al. |

(Continued)

FOREIGN PATENT DOCUMENTS

| | | |
|---|---|---|
| CA | 2254560 | 9/1999 |
| CA | 2254560 A1 | 9/1999 |

(Continued)

OTHER PUBLICATIONS

Abstract; Research Disclosure, XP—002305761; "Concentrated Gellan Gum Gel (5%) Suitable to Gel Various Other Systems"; King, A.H.; 1996 (1 page total).

(Continued)

*Primary Examiner* — Ling X Xu
(74) *Attorney, Agent, or Firm* — Fitch, Even, Tabin & Flannery LLP

(57) ABSTRACT

Disclosed are thickener compositions composed of xanthan gum and a chelating agent, such as ascorbic acid. The chelating agent is present in an amount with respect to said xanthan such that, when said thickener composition is used to thicken a food product, at least one mineral selected from the group consisting of iron, zinc, and calcium present in said food product is relatively more bioavailable than the mineral would be in the absence of said chelating agent. The thickener composition finds particular applicability for use with baby formulas and breast milk intended for dysphagic infants. Also disclosed are baby formulas and thickened breast milk formulations, methods for preparing same, and methods for providing nutrition.

10 Claims, No Drawings

(56) References Cited

U.S. PATENT DOCUMENTS

| | | | | |
|---|---|---|---|---|
| 4,996,070 | A | | 2/1991 | Nafisi-Movaghar |
| 4,997,571 | A | | 3/1991 | Roensch et al. |
| 5,118,513 | A | * | 6/1992 | Mehansho et al. ..... 426/2 |
| 5,165,946 | A | | 11/1992 | Taylor et al. |
| 5,202,146 | A | | 4/1993 | Singer et al. |
| 5,251,699 | A | | 10/1993 | Lau et al. |
| 5,270,459 | A | | 12/1993 | Shatzman et al. |
| 5,300,302 | A | | 4/1994 | Tachon et al. |
| 5,302,292 | A | | 4/1994 | Soeder et al. |
| 5,306,519 | A | | 4/1994 | Peterson |
| 5,338,561 | A | | 8/1994 | Campbell et al. |
| 5,362,713 | A | | 11/1994 | Westland et al. |
| 5,366,028 | A | | 11/1994 | Kobayashi |
| 5,385,748 | A | | 1/1995 | Bunger et al. |
| 5,445,195 | A | | 8/1995 | Kim |
| 5,466,464 | A | | 11/1995 | Masaki |
| 5,536,825 | A | | 7/1996 | Yeh et al. |
| 5,538,751 | A | | 7/1996 | Carter et al. |
| 5,597,604 | A | | 1/1997 | Chalupa |
| 5,607,714 | A | | 3/1997 | Connolly |
| 5,633,028 | A | | 5/1997 | Wong |
| 5,641,532 | A | | 6/1997 | Pflaumer et al. |
| 5,648,093 | A | | 7/1997 | Gole et al. |
| 5,654,027 | A | | 8/1997 | Chalupa |
| 5,811,148 | A | | 9/1998 | Chiu et al. |
| 5,816,446 | A | | 10/1998 | Steindorf et al. |
| 5,837,272 | A | | 11/1998 | Fierro, Jr. et al. |
| 5,869,029 | A | | 2/1999 | Graff-Andersen et al. |
| 5,869,118 | A | | 2/1999 | Morris et al. |
| 5,919,512 | A | | 7/1999 | Montezinos |
| 5,932,235 | A | | 8/1999 | Ninomiya et al. |
| 5,976,084 | A | | 11/1999 | Tymchuck |
| 5,985,339 | A | | 11/1999 | Kamarei |
| 5,997,907 | A | | 12/1999 | Goswami et al. |
| 6,001,408 | A | | 12/1999 | Dudacek et al. |
| 6,007,848 | A | | 12/1999 | Hendrick et al. |
| 6,010,032 | A | | 1/2000 | Vermylen et al. |
| 6,013,294 | A | | 1/2000 | Bunke |
| 6,022,576 | A | | 2/2000 | Cirigliano et al. |
| 6,029,857 | A | | 2/2000 | Keller |
| 6,033,712 | A | | 3/2000 | Greenshields et al. |
| 6,033,713 | A | | 3/2000 | Sheldon |
| 6,036,982 | A | | 3/2000 | Lehmberg et al. |
| 6,036,986 | A | | 3/2000 | Cirigliano et al. |
| 6,056,984 | A | | 5/2000 | Ekanayake et al. |
| 6,077,501 | A | | 6/2000 | Sickora et al. |
| 6,139,895 | A | | 10/2000 | Zablocki et al. |
| 6,149,962 | A | | 11/2000 | Loh et al. |
| 6,162,471 | A | | 12/2000 | Sheldon |
| 6,174,549 | B1 | | 1/2001 | Greenshields et al. |
| 6,200,623 | B1 | | 3/2001 | Dudacek et al. |
| 6,214,406 | B1 | | 4/2001 | Reimerdes |
| 6,277,395 | B1 | | 8/2001 | Fukui et al. |
| 6,303,039 | B1 | | 10/2001 | Back et al. |
| 6,326,040 | B1 | | 12/2001 | Kearney et al. |
| 6,423,348 | B1 | | 7/2002 | Mickus |
| 6,455,090 | B1 | | 9/2002 | Uzuhashi et al. |
| 6,458,395 | B1 | | 10/2002 | Emoto |
| 6,461,589 | B2 | | 10/2002 | Robbins |
| 6,559,187 | B2 | | 5/2003 | Chandran et al. |
| 6,613,400 | B1 | | 9/2003 | Murphy et al. |
| 6,686,341 | B1 | | 2/2004 | Bijlsma et al. |
| 6,693,216 | B2 | | 2/2004 | Raczek et al. |
| 6,759,073 | B2 | | 7/2004 | Heisey et al. |
| 7,052,725 | B2 | | 5/2006 | Chang et al. |
| RE39,125 | E | | 6/2006 | Fukui et al. |
| 7,288,277 | B2 | | 10/2007 | Zhao et al. |
| 7,320,810 | B2 | | 1/2008 | Wuersch et al. |
| 7,429,326 | B2 | | 9/2008 | Levy |
| 7,638,150 | B2 | | 12/2009 | Holahan |
| 7,764,992 | B2 | | 7/2010 | Mabary et al. |
| 8,445,044 | B2 | | 5/2013 | Stetzer |
| 9,414,615 | B2 | | 8/2016 | Sridhar |
| 10,327,461 | B2 | | 6/2019 | Stetzer |
| 10,653,169 | B2 | | 5/2020 | Stetzer |
| 2001/0036439 | A1 | | 11/2001 | Robbins |
| 2002/0031525 | A1 | | 3/2002 | Kobzeff |
| 2003/0044351 | A1 | | 3/2003 | Robbins |
| 2003/0211204 | A1 | | 11/2003 | Fields |
| 2004/0197456 | A1 | | 10/2004 | Holahan |
| 2004/0228954 | A1 | | 11/2004 | Tejayadi |
| 2004/0258823 | A1 | | 12/2004 | Dufresne et al. |
| 2005/0211768 | A1 | | 9/2005 | Stillman |
| 2006/0051296 | A1 | | 3/2006 | Holahan |
| 2006/0207925 | A1 | | 9/2006 | Levy |
| 2007/0020358 | A1 | | 1/2007 | Mower |
| 2007/0138093 | A1 | | 6/2007 | Bossler et al. |
| 2007/0172568 | A1 | | 7/2007 | Spelman |
| 2007/0196495 | A1 | | 8/2007 | Soltero |
| 2007/0224126 | A1 | | 9/2007 | Dufresne et al. |
| 2007/0264401 | A1 | | 11/2007 | Taormina et al. |
| 2008/0223799 | A1 | | 9/2008 | Tsai |
| 2008/0226800 | A1 | | 9/2008 | Lee et al. |
| 2008/0248184 | A1 | | 10/2008 | Esteve et al. |
| 2009/0074940 | A1 | | 3/2009 | Sliwinski |
| 2009/0162515 | A1 | | 6/2009 | Dufresne et al. |
| 2009/0291192 | A1 | | 11/2009 | Holahan |
| 2010/0055207 | A1 | | 3/2010 | Holahan |
| 2010/0055262 | A1 | | 3/2010 | Holahan |
| 2010/0119559 | A1 | | 5/2010 | Dansereau et al. |
| 2010/0166917 | A1 | | 7/2010 | Smith |
| 2010/0178397 | A1 | | 7/2010 | Stetzer |
| 2010/0215804 | A1 | | 8/2010 | Goto et al. |
| 2010/0233320 | A1 | | 9/2010 | Sunvold et al. |
| 2011/0135568 | A1 | | 6/2011 | Holahan |
| 2011/0135799 | A1 | | 6/2011 | Holahan |
| 2013/0059059 | A1 | | 3/2013 | Tristram |
| 2013/0236625 | A1 | | 9/2013 | Stetzer |

FOREIGN PATENT DOCUMENTS

| | | | |
|---|---|---|---|
| CA | 2574247 | | 7/2007 |
| CA | 2574247 | A1 | 7/2007 |
| DE | 19918210 | A1 | 2/2000 |
| DE | 19918210 | | 11/2000 |
| DE | 19918210 | A1 | 11/2010 |
| EP | 0130771 | | 1/1985 |
| EP | 0130771 | | 1/1987 |
| EP | 0620012 | | 10/1994 |
| EP | 0620012 | A1 | 10/1994 |
| EP | 0620112 | | 10/1994 |
| EP | 0620112 | A1 | 10/1994 |
| EP | 1046347 | | 10/2000 |
| EP | 1046347 | A1 | 10/2000 |
| EP | 1078981 | | 2/2001 |
| EP | 1078981 | A1 | 2/2001 |
| EP | 1810579 | | 7/2007 |
| EP | 1810579 | A1 | 7/2007 |
| JP | 06040950 | | 2/1994 |
| JP | 06040950 | A | 2/1994 |
| JP | 07274915 | | 10/1995 |
| JP | 07274915 | A | 10/1995 |
| JP | 11124342 | | 5/1999 |
| JP | 1187827 | | 7/1999 |
| JP | 11187827 | | 7/1999 |
| JP | 10131478 | | 11/1999 |
| JP | 10229517 | | 11/1999 |
| JP | 11318356 | | 11/1999 |
| JP | 200041594 | | 2/2000 |
| JP | P200041594 | | 2/2000 |
| JP | 2000135070 | | 5/2000 |
| JP | 2000135070 | A | 5/2000 |
| JP | 2000325041 | | 11/2000 |
| JP | 2000325041 | A | 11/2000 |
| JP | 2003002901 | | 1/2003 |
| JP | 2016208895 | | 12/2016 |
| WO | 9925208 | | 5/1999 |
| WO | 9925208 | A1 | 5/1999 |
| WO | 9934690 | | 7/1999 |
| WO | 0057727 | | 10/2000 |
| WO | 0057727 | A1 | 10/2000 |
| WO | 9934690 | | 10/2000 |
| WO | 0115743 | | 3/2001 |
| WO | 0115743 | A2 | 3/2001 |

(56) References Cited

FOREIGN PATENT DOCUMENTS

| | | | |
|---|---|---|---|
| WO | 0179521 | | 10/2001 |
| WO | 0179521 | A1 | 10/2001 |
| WO | 0211716 | | 2/2002 |
| WO | 0211716 | A2 | 2/2002 |
| WO | 0226264 | | 4/2002 |
| WO | 2002026264 | | 4/2002 |
| WO | 0243509 | | 6/2002 |
| WO | 2002043509 | | 6/2002 |
| WO | 03011051 | | 2/2003 |
| WO | 03011051 | A1 | 2/2003 |
| WO | 2003011051 | | 2/2003 |
| WO | 2004069179 | | 8/2004 |
| WO | 2006054886 | | 5/2006 |
| WO | 2006065136 | | 6/2006 |
| WO | 2008137181 | | 11/2008 |
| WO | 2011028286 | | 3/2011 |
| WO | 2011140598 | | 11/2011 |
| WO | 2012097918 | | 7/2012 |
| WO | 2017002722 | | 1/2017 |
| WO | 2018045419 | | 3/2018 |
| WO | 2019165506 | | 9/2019 |

OTHER PUBLICATIONS

American College of Radiology; ACR Appropriateness Criteria; "Imaging Recommendations for Patients with Dysphagia"; p. 225-230 (6 pages total), 2000.
American Speech-Language Hearing Association; "Communication Facts, Special Populations: Dysphagia"; 2001 Edition http://professional.asha.ora/research/dvsohaaia.htm (6 pages total).
American Speech-Language Hearing Association; "Special Populations: Stroke"; 2001 Edition; http://professional.asha.org/research/dysphagia.htm (6 pgs.).
Art. 94(3) EPC Communication, European Application No. 027596246.8, dated Apr. 16, 2008, (6 pgs.).
Art. 94(3) EPC Communication, European Application No. 04707165.9, dated Apr. 7, 2008, (5 pgs.).
Art. 96(2) EPC Communication, European Application No. 027596246.8, dated Apr. 10, 2007, (5 pgs.).
Art. 96(2) EPC Communication, European Application No. 027596246.8, dated Nov. 13, 2007, (3 pgs.).
Art. 96(2) EPC Communication, European Application No. 04707165.9, dated Aug. 7, 2006, (5 pgs.).
Cinogel Biotech, "High Acyl Gellan Gum VS Low Acyl Gellan Gum," https://www.cinogel.com/p/high-acyl-gellan-gum-vs-low-acyl-gellan.html, Jun. 22, 2020.
Compiled by a Castrogiovanni, Communication Facts: Special Populations: Dysphagis BO 2002 Edition, ASHA Resource Center, http://professional.asha.orglresearchldysphagia.html (3 pgs.).
CP Kelco U.S., Inc., Kelcogel Gellan Gum Book, 5th Edition, bearing a copyright date of 2001-2008.
Decision to Grant EPC Communication, European Application No. 04707165.9, dated Dec. 30, 2008, (2 pgs.).
Department of Health and Human Services, FDA; 21 CFR Part 201 (DKT 90N0364 RIN0905-AD91, Regulation of Medical Foods: Advance Notice of Proposed Rulemaking Federal Redister vol. 61., Aug. 2, 1993.
Department of Health and Human Services; Food & Drug Administration; Warning Statements Required for Over-The-Counter Drugs Containing Water-Soluble Gums as Active Ingredients Federal Register; vol. 58, No. 164; Thursday, Aug. 26, 1993/Rules and Regulations (8 pages total).
Dysphagia 9:209-217; "Epidemiology and Dysphagia"; Keith V. Kuhlemeier, PhD, MPH; 1994; p. 209-217 (9 pages total).
English Translation of Published Japanese Patent Application No. JP11187827A (16 pgs.).
European Patent Office, European Search Report, dated Mar. 9, 2011, pp. 1-57.
European Search Report, European Application No. 09005203.6, dated Jun. 16, 2009, (5 pgs.).
Ikegami, S. et al., "Effect of viscous indigestible polysacchardes on pancreatic-billary secretion and digestive organs in rats", Journal of Nutrition, 120, pp. 353-360, 1990.
Intent to Grant EPC Communication, European Application No. 02759246.8, dated Apr. 27, 2009, (32 pgs.).
Intent to Grant EPC Communication, European Application No. 04707165.9, dated Jul. 28, 2008, (33 pgs.).
International Search Report 02759246.8-1221-US02/24525 P71214EPOO 4 pages, dated Dec. 8, 2004.Jenkins, D.JA et al., "Dietary fibres, fibre analogues, and glucose tolerance: importance of viscosity", British Medical Journal, 1, pp. 1392-1394, May 27, 1978.
International Search Report and Written Opinion for International Patent Application No. PCT/US2021/054942 dated Feb. 3, 2022.
Jenkins; D.JA et al., "Unabsorbable carbohydrates and diabetes: decreased post-prandial hyperalycaemia", The Lancet, 308, pp. 172-174, Jul. 24, 1976.
NPL "Honey Density" retrieved on May 21, 2014.
NPL Xanthan retrieved on May 22, 2014.
NYEEI: Otolaryngology: Faqs About Swallowing Disorders, Online, NYEEI: http://www.nyee.edu/faqlist.html?tablename=faz&key=48&print=, 1999.
Reinagel M et al., "Is Mineral Water Good For You?" (posted Jul. 2, 2010).
Siddall, Pauline M et al., "Dysphagia in the elderly: a learning experience for those new to this field." Caring to Communicate. International Journal of Language and Communication Disorders, vol. 30, Issue S1 (Oct. 1995), pp. 423-432.
SimplyThick, LLC, EasyMix, How to Use Demo Video, https://www.simplythick.com/How-to-Use-Videos, Mar. 29, 2018.
Torsdottir, I. et al., "A small dose of soluble alginate-fiber affects postprandial glycemia and gastric emptying in humans with diabetes", Journal of Nutrition, 121, pp. 795-799, 1991.
U.S. Food and Drug Administration Center for Food Safety and Applied Nutrition [Online] http://www.cfsan.fda.gov/-dms/ds-medfd.html Aug. 24, 2001.
Wolever, T.M.S. et al., Guar gum and reduction of post-prandial glycaemia: effect of incorporation into solid food, liuid food, and both, Br. J. Nutr. (1979) 4x, 505.
Written Opinion of the International Searching Authority, International Application No. PCT/US02/24525, dated Feb. 18, 2004; (5 pgs.).
Written Opinion of the International Searching Authority, PCT Application No. PCT/US2008/005905, dated Aug. 6, 2008, 4 pp.
NPL "Xanthan" by Bosscher D et al. entitled "Availabilities of Calcium . . . Frations" in Nutrition 19: 641-645,2003.*
English Translation of Published Japanese Patent Application No. JP11187827 A (16 pgs.), Aug. 13, 1999.
International Search Report 02759246.8-1221-US02/24525 P71214EPOO 4 pages, US02/ . . . is 2002.
Department of Health and Human Services; Food & Drug Administration; Warming Statements Required for Over-The-Counter Drugs Containing Water-Soluble Gums as Active Ingredients Federal Register; vol. 58, No. 164; Thursday, Aug. 26, 1999/Rules and Regulations (8 pages total).
American College of Radiology; ACR Appropriateness Criteria; "Imaging Recommendations for Patients with Dysphagia"; p. 225-230 (6 pages total), p. 227 last line year 1998.
American Speech-Language Hearing Association; "Communication Facts, Special Populations: Dysphagia"; 1999 Edition (3 pages total).
Li, Meijing et al., "Viscosity Measurements of Barium Sulfate Mixtures for Use in Motility Studies of the Pharynx and Esophagus." Dysphagia 7 (1992), pp. 17-30.
Siddall, Pauline M et al., "Dysphagia in the elderly: a learning experience for those new to the field." Caring to Communication Disorders, vol. 30, Issue S1 (Oct. 1995), pp. 423-432.
Winstein, Carolee J., "Neurogenic Dysphagia: Frequency, Progression, and Outcome in Adults Following Head Injury." Physical Therapy. vol. 63, No. 12 (Dec. 1983), pp. 1992-1997.
Written Opinion of the International Searching Authority, PCT application No. PCT/US2008/005905, Aug. 6, 2008, 4 pp.

(56) References Cited

OTHER PUBLICATIONS

Sopade et al., Moisture absorption characteristics of food thickeners used for the management of swallowing dysfunctions, Eur. Food Res. Technol., 2007, 555-560, 224, Springer Verlag, United States.
European Patent Office, European Search Report, Mar. 9, 2011, pp. 1-57.
Buckley, John E. et al., "Feeding Patients with Dysphagia." Nursing Forum. vol. XV, No. 1 (1976), pp. 69-85.
Kuntz, Lynn A., "Special Effects with Gums," Food Product Design, Dec. 1, 1999, 17 pages.
American Speech-Language Hearing Association: "Communication Facts, Special Populations: Dysphagia"; 2001 Edition; http:// orofessional.asha.ora/research/dvsohaaia.htm (6 pages total).
Journal of Neuroscience Nursing, Apr. 1989, vol. 21, No. 2; "Dysphagia in Huntington's Disease"; Vicki P. Hunt, RN, Francis O. Walker, MD; p. 92-95 (4 pages total).
Abstract; Research Disclosure, XP-00230576"1; "Concentrated Gelian Gum Gel (5%) Suitable to Gei Various Other Systems"; King, A.H.; 1996 (1 page total).
Arch Neurol—vol. 42, Jan. 1985; "Dysphagia in Huntington's Disease"; Norman A. Leopold, DO, Marion C. Kagel, MA; p. 57-60 (4 pages total).
Ikegami, S. et al., "Effect of viscous indigestible polysaccharides on pancreatic-biliary secretion and digestive organs in rats", Journal of Nutrition, 120, pp. 353-360, 1990.
Dietary Fiber Definition Committee, "The definition of dietary fibre", Cereal Foods World, 46, pp. 112-126, Mar. 2001.
Jenkins, D.JA et al., "Dietary fibres, fibre analogues, and glucose tolerance: importance of viscosity", British Medical Journal, 1, pp. 1392-1394, May 27, 1978.
Torsdottir, I. et al., "A small dose of soluble alginate-fiber affects postprandial glycemia an gastric emptying in humans with diabetes," Journal of Nutrition, 121 pp. 795-799, 1991.
Jenkins, D.JA et al., "Unabsorbable carbohydrates and diabetes: decreased post-prandial hyperglycaemia", The Lancet. 308, pp. 172-174, Jul. 24, 1976.
Wolever, T.M.S. et al., "Guar gum and reduction of post-prandial glycaemia: effect of incorporation into solid food, liquid food, and both", British Journal of Nutrition, 41, pp. 505-51 0, 1979.
Reppas, C. et al., "High viscosity hydroxypropylmethylcellulose reduces postprandial blood glucose concentrations in NIDDM patients", Diabetes Research and Clinical Practice, 22, pp. 61-69, 1993.
Canadian Examiner's Notice of Allowance on patent application No. 2509715 dated Oct. 26, 2009 (1 pg.).
American Speech-Language Hearing Association; "Special Populations: Stroke"; 2002 Edition; http://professional.asha.orglresearch/ dysphagia.htm (6 pgs.).
Applied microbiology and biotechnology, Aug. 1998, vol. 50, No. 2, "Xanthan gum biosynthesis and application:a biochemical/ genetic perspective", A. Becker a F. Katzen a A. PuE hler a L lelpi, p. 145-152 (8 pgs.).
Art. 96(2) EPC Communication, European Application No. 027596246. 8, Date of Mailing Apr. 10, 2007, (5 pgs.).
Art. 96(2) EPC Communication, European Application No. 027596246. 8, Date of Mailing Nov. 13, 2007, (3 pgs.).
Art. 94(3) EPC Communication, European Application No. 027596246. 8, Date of Mailing Apr. 16, 2008, (6 pgs.).
Art. 94(3) EPC Communication, European Application No. 0271596246. 8, Date of Mailing Nov. 13, 2008, (3 pgs.).
Art. 96(2) EPC Communication, European Application No. 04707165. 9, Date of Mailing Aug. 7, 2006, (5 pgs.).
Art. 94(3) EPC Communication, European Application No. 04707165. 9, Date of Mailing Apr. 7, 2008, (5 pgs.).
Australian Examiner's report No. 5 on patent application No. 2002324592 dated Apr. 30, 2008 (3 pgs.).
Australian Examiner's report No. 6 on patent application No. 2002324592 dated Jun. 5, 2008 (3 pgs.).
Canadian Examiner's Notice of Allowance on patent application No. 2459924 dated Feb. 23, 2009 (1 pg.).
Canadian Examiner's Requisition on patent application No. 2459924 dated Jul. 21, 2005 (4 pgs.).
Canadian Examiner's Requisition on patent application No. 2459924 dated Apr. 3, 2006 (4 pgs.).
Canadian Examiner's Requisition on patent application No. 2459924 dated Nov. 29, 2006 (4 pgs.).
Canadian Examiner's Requisition on patent application No. 2459924 dated Sep. 7, 2007 (3 pgs.).
Canadian Examiner's Requisition on patent application No. 2459924 dated Apr. 22, 2008 (5 pgs.).
Canadian Examiner's requisition on patent application No. 2509715 dated Feb. 19, 2009 (3 pgs.).
Compiled by a Castrogiovanni, Communication Facts: Special Populations: Dysphagis BO 2002 Edition, ASHA Resource Center, htlp:IIprofessional.asha.orglresearchldysphagia.html (3 pgs.).
Decision to Grant EPC Communication, European Application No. 04707165.9, Date of Mailing Dec. 30, 2008, (2 pgs.).
European Search Report, European Application No. 027596246.8, Date of Mailing Aug. 12, 2004, (4 pgs.).
European Search Report, European Application No. 04707165.9, Date of Mailing Jan. 27, 2006, (4 pgs.).
European Search Report, European Application No. 09005203.6, Date of Mailing Aug. 12, 2004, (6 pgs.).
Intent to Grant EPC Communication, European Application No. 04707165.9, Date of Mailing Apr. 27, 2009, (32 pgs.).
Intent to Grant EPC Communication, European Application No. 04"10"1165.9, Date of Mailing Jul. 28, 2008, (33 pgs.).
PCT Notification of Transmittal of International Preliminary Examination Report, International Application No. PCT/US02/24525, Date of Mailing Aug. 23, 2004; (5 pgs.).
PCT Notification of Transmittal of the International Search Report or the Declaration, International Application No. PCT/US02/24525, Date of Mailing Dec. 2, 2002; (6 pgs.).
Nussinovitch, A., "Xanthan gum," Hydrocolloid Application, (1997), pp. 154-168.
Xanthan gum, G. Sworn, Monsanto (Kelco Biopolymers, Tadworth), in Handbook of Hydrocolloids, ed. G.O. Phillips and P. Williams, Woodhead Publishing Ltd, Cambridge, England, Jul. 2000, pp. 103-115. Available at: http://docencia.izt.uam.mx/epa/quim_alim/ tareas/xantana.pdf.
Austrialian Examiner's report No. 4 on patent application No. 2002324592 dated Mar. 28, 2008 (4 pgs.).
Castellanos. V. H .. PHD, RD: Butler, E. RD; Gluch, L., RD; Burke, B., RD, Use of Thickened Liquids in Skilled Nursing Facilities, Jrnl of the Amer Dietetic Association Aug. 2004.
Deis, Ronald C., Ph.D., Dietary Fiber: A Heal Thy Discussion, Weeks Publishing Co, Jan. 1999, Design Elements Online, http:// www.foodoroductdesian.com/archive/1990/01 99de.html.
Edmonds, C., M.R.C.P. D.P.M., Huntington's Cora, Dysphagia and Death, The Medical Journal of Australia, Aug. 6, 1966.
Department of Health and Human Services, FDA; 21 CFR Part 201 (DKT 90N0364 RIN0905-AD91, Regulation of Medical Foods: Advance Notice of Proposed Rulemaking Federal register vol. 61, No. 231, Nov. 29, 1996.
U.S. Food and Drug Administration Center for Food Safety and Applied Nutrition [Online] http:/lwww.cfsan.fda.gov/-drns/ds-medfd. html Aug. 24, 2001.
Lontong, V.; Texture and Flavor Characteristics of Beverages Containing Commercial Thickening Agents for Dysphagia Diets, Journal of Food SCience, vol. 68, Nov. 4, 2003 1537-1541.
PCT Notification of Transmittal of the International Search Report or the Declaration, International Application No. PCT/US02/24525, Date of Mailing Dec. 2, 2002; 6 pages.

* cited by examiner

THICKENER COMPOSITION, THICKENED NUTRITIVE PRODUCTS, METHODS FOR PREPARING THICKENED NUTRITIVE PRODUCTS, AND METHODS FOR PROVIDING NUTRITION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

[This application claims priority to the prior provisional application Ser. No. 61/793,628 filed Mar. 15, 2013. The entire contents of this application are hereby incorporated by reference in their entireties.] *More than one reissue application has been filed for the reissue of U.S. Pat. No. 9,101,156. The reissue applications are U.S. application Ser. No. 17/235,699 (the present application), Ser. No. 16/388,160, and Ser. No. 15/343,756. Application Ser. No. 17/235,699, filed on Apr. 20, 2021, is a continuation reissue application of reissue application Ser. No. 16/388,160, filed Apr. 18, 2019, now U.S. Pat. No. RE48,607, which is a continuation reissue application of reissue application Ser. No. 15/343,756, filed Nov. 4, 2016, now U.S. Pat. No. RE47,448, which is a reissue of U.S. Pat. No. 9,101,156, which claims the benefit of U.S. Provisional Application No. 61/793,628, filed on Mar. 15, 2013, all prior applications of which are incorporated by reference.*

FIELD

The field relates in some embodiments to providing nutrition to patients with dysphasia, and in many embodiments, to dysphagic infants.

BACKGROUND

Patients with dysphagia have difficulty in swallowing food and liquids. Dysphasia management can be provided by thickening foods and liquids to assist in swallowing. Thickened products reduce the likelihood of aspiration of liquids in to the windpipe, and provide for a slower fluid flow rate to allows for easier control of swallowing. Current products available for thickening foods and liquids include powder products such as THICK-IT® (Precision Foods, St. Louis, Mo. USA), THICKEN UP® (Novartis Nutrition, Minneapolis, Minn. USA), and THICK & EASY® (Hormel Healthlabs, Austin, Minn. USA). Pre-thickened liquids are also available from THICK & EASY® (Hormel Healthlabs, Austin, Minn. USA), NUTRA/BALANCE™ (Ross Products, Columbus, Ohio USA) and RESOURCE® (Novartis Nutrition, Minneapolis, Minn. USA). Thickeners are also available as concentrated thickening solutions.

Certain prior approaches to thickening food products, including medication and other products for oral ingestion, have relied on the use of starch based thickener compositions. The use of starch based thickeners can be associated with undesirable organoleptic properties such as a grainy texture, susceptibility to enzymatic degradation, and increased caloric intake. Starch granules which swell and provide increased viscosity to thicken a food product may result in a grainy texture in the thickened food product.

Starch based thickeners containing amylose are susceptible to breakdown by certain enzymes, including amylase, present in the mouth, and can be less compatible for thickening food products such as milk. Milk, including human breast milk, has a unique composition that includes amylase and fat, which can present challenges when using traditional starch thickening agents. The presence of amylase in milk tends to break down the starch in starch-based thickening agents, thus decreasing the thickening capacity of the starch. Lipids present in milk may coat the starch granules and also reduce the effectiveness of starch based thickeners.

Premature infants often are dysphagic because they have not develop a suckling reflex. Thickened beverages, such as baby formulas and breast milk, desirably should have a viscosity of up to 2000 centipoise.

SUMMARY

In some embodiments, a thickener composition is provided. The thickener composition is suitable for adding to food products, in particular baby formula and breast milk. The thickener composition may comprise xanthan gum; a chelating agent, and a dissolution agent. The chelating agent may be present in an amount with respect to the xanthan such that, when the thickener composition is used to thicken a food product, at least one mineral selected from the group consisting of iron, zinc, and calcium present in the food product is relatively more bioavailable than would be in the absence of said chelating agent. The dissolution agent may be present in an amount effective to enhance dissolution of the xanthan gum. The chelating agent may be, for example, ascorbic acid, and the dissolution agent may be, for example, a malto-oligosaccharide.

In another embodiment, not mutually exclusive with respect to the above, a thickened breast milk product that comprises breast milk, xanthan gum, and a chelating agent is provided. It is contemplated that the thickened breast milk may be prepared in situ by a parent or caregiver (such as a hospital) after the mother of a dysphagic infant has expressed the breast milk, by adding a thickener composition to the breast milk. The xanthan gum is present in an amount effective to thicken the breast milk to a viscosity suitable for ingestion by dysphagic infants. The chelating agent is present in an amount effective to increase the bioavailability to a dysphagic infant of at least one mineral selected from the group consisting of iron, zinc, and calcium relative to the absence of the chelating agent.

In yet another embodiment, not mutually exclusive with respect to the above, a baby formula that comprises nutritive components suitable for ingestion by an infant, xanthan, and a chelating agent is provided. It is contemplated that the thickened baby formula may be prepared in advance and sold in prepackaged form to parents of dysphagic infants or to caretakers. The nutritive components in the baby formula include at least one mineral selected from the group consisting of iron, calcium, and zinc, and may include other nutritive components as is typical. The xanthan gum is present in an amount effective to provide to a viscosity of the baby formula suitable for ingestion by dysphagic infants. The chelating agent is present in an amount effective to increase the bioavailability to a dysphagic infant of the mineral relative to the absence of said chelating agent.

In another aspect, not mutually exclusive with respect to the above, a method for preparing a thickened breast milk product is provided. The method comprises providing breast milk, providing a thickener composition, and adding the thickener composition to said breast milk in an amount effective to thicken said breast milk to a viscosity suitable for ingestion by dysphagic infants is provided. The thickener composition comprises xanthan gum and a chelating agent as described above.

In yet another embodiment, not mutually exclusive with respect to the above, a method for preparing a thickened baby formula product is provided. The method comprises providing a baby formula, providing a thickener composition, and adding the thickener composition to the baby formula in an amount effective to thicken said baby formula to a viscosity suitable for ingestion by dysphagic infants. The baby formula comprises nutritive components suitable for ingestion by an infant and thickener composition comprises xanthan gum and a chelating agent as discussed above.

In other embodiments, not mutually exclusive with respect to the above, a method for providing nutrition to a dysphagic infant is provided. The method includes administering a thickened breast milk product or baby formula as described herein

DETAILED DESCRIPTION OF PREFERRED EMBODIMENTS

The invention contemplates thickeners and products that include starch. Nonetheless, in some embodiments, there is no starch in the thickener composition or in the baby formula or breast milk. Generally, the use of a xanthan gum is contemplated as a thickener, alone or in combination with other thickeners, and in many cases as the sole or primary thickener. Xanthan gum, also known as xanthan, is a high molecular weight, long, chain polysaccharide comprising side chains of galactomannan with carboxyl groups derived from the bacteria Xanthomonas campestris.

Any suitable xanthan gum may be employed in connection with the invention. For example, xanthan gum that meets the specifications of the National Formulary, the Food Chemicals Codex and the J.E.C.F.A. may be employed. The xanthan gum may have the following specifications:

| GENERAL CHARACTERISTICS | |
|---|---|
| Viscosity | (1.0% in 1.0% KCl) 1400-1800 cP |
| Particle Size | 98% minimum through USS 16 mesh, 1190μ<br>12% maximum through USS 80 mesh, 177μ |
| Powder Color | Not less than 60 |
| pH (1.0% Solution) | 5.5 to 8.1 |
| STANDARD SPECIFICATIONS | |
| Identification | Meets NF/FCC tests |
| Assay | Meets NF/FCC tests |
| Loss on Drying | Not more than 15% |
| Viscosity | Meets NF/FCC tests |
| Ash | Between 6.5% and 16% |
| Arsenic | Not more than 3 ppm |
| Lead | Not more than 5 ppm |
| Heavy Metals (as Pb) | Not more than 20 ppm |
| Isopropyl Alcohol | Not more than 750 ppm |
| Pyruvic Acid | Not less than 1.5% |
| Nitrogen | Not more than 1.5% |
| MICROBIOLOGICAL | |
| Total Plate Count | Not more than 2000/g |
| Yeast and Molds | Not more than 100/g |
| *Salmonella* | Meets NF test |
| *Escherichia coli* | Meets NF test |
| SHELF LIFE | |
| 36 months from the certificate of analysis test date | |

It is known that carboxyl groups on the galactomannan side chains of xanthan tends to bind to positively charged entities. ("Food Polysaccharides and Their Applications," Second Edition, Ed. Alistair M Stephen, et al.) The positively charged groups or entities may include cations, divalent molecules, and compounds having positively charged groups such as an amine or aryl group, and the like. Positively charged entities can include calcium, iron, and zinc as may be present in milk and in baby formulas. Such minerals may be bound to the carboxyl groups on the galactomannan side chains of xanthan. It has been found that the bioavailability of such minerals can be substantially reduced when a product such as a breast milk product or baby formula is thickened with xanthan gum.

Surprisingly, however, it has been found that the use of certain chelating agents, such as ascorbic acid, can ameliorate the effects of xanthan in reducing the bioavailability of such minerals. One particularly suitable chelating agent is ascorbic acid. Without wishing to be bound by any particular theory, it is believed that the ascorbic acid acts as a chelating agent to form a chelate complex with the positively charged entity. The ascorbic acid is believed to have a higher affinity to the positively charged groups than the carboxyl groups on the xanthan side chains, and is thus effective to minimize the xanthan binding of these side chains to the positively charged groups. Upon ingestion, the ascorbic acid then releases the charged minerals and allows for then to be made bioavailable.

Bioavailability generally refers to the extent to which substances reach the bloodstream. In the context of medications or minerals, bioavailability refers to the extent to which the medications or minerals reach the systemic circulation. When orally ingested minerals or drug compounds are bound to xanthan, there is a decreased absorption of these substances from the intestinal lumen into the bloodstream. Bioavailability may be evaluated by a piglet in vivo study as described hereinbelow in the Examples. Generally, the piglets may be brought to homeostasis with a diet of glucose, then provided with the product to be ingested (for instance, breast milk or formula thickened with xanthan gum). From a blood sample, the amount of the medication or mineral or appropriate metabolite of same may be determined. Bioavailability may be determined as an average over a number of piglets as described below.

Any suitable chelating agent may be employed in conjunction with the invention. The use of ascorbic acid is deemed to be particularly advantageous. Ascorbic acid is a strong enhancer of non-heme-iron absorption. The mechanisms for this absorption enhancement include the reduction of dietary ferric iron to its better-absorbed ferrous form, and the formation of an iron-ascorbic acid chelate in the acid milieu of the stomach. Although ascorbic acid does not in many cases enhance iron absorption from most ferrous iron supplements in the absence of meals, it can increase the bioavailability of ferrous iron added as a fortificant to foods, especially when those foods contain a large amount of iron absorption inhibitors. This is true whether the fortificant iron is a simple ferrous salt or a chelate such as NaFeEDTA. Even less-bioavailable iron salts, such as ferric orthophosphate and ferric pyrophosphate, are reasonably well-absorbed in the presence of ascorbic acid. Breast milk may contain protein to which iron is bound. The addition of ascorbic acid may result in iron becoming unbound from the protein to form a chelate complex with ascorbic acid. Once bound to the ascorbic acid instead of the protein, the iron can be absorbed into the bloodstream and becomes bioavailable. Thus, the addition of ascorbic acid may increase the bioavailability of iron not only as a result of preventing iron from binding to xanthan, but also of iron as a result of reducing the iron to a more bioavailable state.

Other suitable chelating agents may be employed. For example, it is contemplated that any one or combination of Ethylenediamine, Porphine, Porphyrins-chelates heme, EDTA (ethylenediametetraacetic acid), Dimercaprol (2,3-dimercapto-1-propanol), Diethylenetriaminepentaacetic acid (DTPA), N,N-bis(Carboxymethyl)glycine (NTA), Deferasirox-iron chelating agent, Succimer, Edetate disodium calcium-$CaNa_2$ EDTA, D-penicillamine, Citrate, Pyrophosphate, Anthocyanins, Selenium, EDDS (Ethylene diamine disuccinic acid), Fosmidomycin, Tridentate, Sexdentate, Bidentate, Transferrin, Amino acids, Amino acids derivatives: histamine, adrenaline, Lipids, Albumin, Nucleic acids, Organic acids, Plant Phenolics: anthocyanins, tannins, Plant alkaloids, Peptides:protamines, Polypeptides: Insulin, growth hormone, Enzymes, Nucleoproteins, Carbonate, bicarbonate, Cyanides, Phosphates, Poryphyrins, Sulfates, Sulfonic acids, chondroitin sulfates, Vitamins: Vitamin B 12, ascorbic acid, BAL or 2,3-dimercaptopropanol-1, CTDA or chef 600, DFOA or Desferrioxamine B, DHEEDA or Versenediol, DHG (N,N-bis(2-hydroxyethyl) glycine, DMPS or Sodium 2,3-dimercaptopropane-1-sulfonate, DMSA or 2,3-dimercaptosuccinic acid, EDDHA or EHPG or Chel 138, EGTA or ethyleneglycol-bis-(d-aminoethyl ether) N,N,N',N'-tetraacetic acid, EHPG or ((ethylene-bis-N,N'-2-o-hydroxyphenyl)glycine), HBEA or (N,N,N'-tris(2-hydroxybenzyl)ethylenediamine-N,N-diacetic acid), HBED or (N,N'-bis.-(o-hydroxybenzyl)ethylenediamine-N,N-diacetic acid), HEDTA or Versenol, HIMDA or (N-2-hydroxyethyl)imino-diacetic acid)), Ionophores (Lasalocid, Valinomycin, Enniatin), (HOOCCH2) 3N, TEA or (triethanolamine), TETHA or TTHA or (triethylenetetraminehexaacetic acid), THBE (N,N,N,N'-tetrakis (2-hydroxygenyl)ethylenediamine), Unithiole or Sodium-2, 3-dimercaptopropane-1-sulfonate may be employed. If employed in combination, the chelating agents may be employed in any suitable ratio with respect to one another. Generally, it is contemplated that other chelating agents included in the thickener composition may include proteins or amino acids. It is believed that proteins and amino acids may assist in transporting minerals, such as zinc, into the bloodstream. Without wishing to be bound by any particular theory, it is believed that protein may serve as a carrier for minerals, including zinc, to be transported from the intestine into the bloodstream. For minerals for which ascorbic acid interaction is low, supplemental chelating agents to assist in transferring of minerals into the bloodstream may be included.

The chelating agent may be present in any suitable amount. Generally, in a when provided in the form of a thickener composition, the chelating agent should be present in an amount with respect to xanthan such that, when said thickener composition is used to thicken a food product, at least one mineral selected from the group consisting of iron, zinc, and calcium present in said food product is relatively more bioavailable than would be in the absence of said chelating agent. The bioavailability again may be determined via a piglet study as described herein. When the chelating agent is ascorbic acid, for instance, the chelating agent may be present with respect to xanthan in a ration of between about or exactly 2000:1.5 to 1000:2.5. In one embodiment, the ratio is about or exactly 1500:2. Generally, in some embodiments, the amount of chelating agent is effective to increase the bioavailability to a dysphagic infant of iron in breast milk by at least 40 percent relative to the absence of the chelating agent, and in other embodiments, at least 50%. In some embodiments, the chelating agent is effective to increase the bioavailability to a dysphagic infant of zinc in breast milk by at least 5 percent relative to the absence of the chelating agent; in other embodiments, at least about 9%. In some embodiments, the chelating agent is effective to increase the bioavailability to a dysphagic infant of calcium in breast milk by at least 5 percent relative to the absence of the chelating agent; in other embodiments, at least about 9%.

Food products for which the thickener is deemed particularly suitable include baby formulas and breast milk. Breast milk generally contains calcium, iron, and zinc, and baby formula may include one, two, or all three of these minerals. When present in a food product, such as breast milk or baby formula, the chelating agent in some embodiments may be present to an extent such that the bioavailability of calcium is at least about 80% of the bioavailability of calcium in the unthickened product (breast milk or baby formula). The chelating agent in some embodiments may be present to an extent such that the bioavailability of zinc is at least about 80% of the bioavailability of zinc in the unthickened product (breast milk or baby formula). The chelating agent in some embodiments may be present to an extent such that the bioavailability of iron is at least about 80% of the bioavailability of iron in the unthickened product (breast milk or baby formula). In some embodiments, the bioavailability of two of, or all three of, the minerals iron, calcium, and zinc is at least about 80% of the bioavailability of each respective mineral in the unthickened product (breast milk or baby formula). When expressed as a percentage, the bioavailability may be determined as the amount of the analyte in question in the bloodstream of the thickened product as a percentage of the amount of the analyte in the bloodstream of the unthickened product.

It is contemplated that the chelating agent may be blended with the xanthan gum when the product is intended for use as a thickener composition. In some embodiments, it is contemplated that the chelating agent may be bound to particles of xanthan with a binder. Any suitable binder may be employed and it is contemplated that the binder may comprise, for example, sodium alginate. The binder may be present in an amount effective to cause the chelating agent to bind to the xanthan. The binder alternatively may be a salt, such as potassium chloride, or may be a starch.

When supplied as a thickener composition, the composition may take any suitable form, such as powder, liquid, or gelatinous or gelatinoid form. In many embodiments, the thickener composition takes the form of a powdered composition. The powdered composition may have any suitable particle size.

In any case, the composition may include a dissolution agent. The dissolution agent may be any component that assists in mixing of xanthan with a food product, such as breast milk or baby formula. Dissolution agents can include carbohydrates and gums, such as hemicellulose, but in many embodiments the dissolution agent is a malto-oligosaccharide. The malto-oligosaccharide may be derived from any starch-bearing grains, such as corn, wheat, rice, potato, and tapioca. Malto-oligosaccharides, or mixtures of predominantly 1-4 linked glucosyl units. In many embodiments, at least 50% of the saccharide units in the malto-oligosaccharide prepared in accordance with the present teachings are linked via 1-4 linkages; in many embodiments, at least 55%; in many embodiments at least 60%; in many embodiments at least 65%; in many embodiments at least 70%; in many embodiments at least 75%; in many embodiments at least 80%; in many embodiments at least 85%; in many embodiments at least 90%; and in many embodiments at least 95% of the saccharide units in the malto-oligosaccharide are linked via 1-4 linkages. Malto-oligosaccharides are contemplated to include saccharide species that have an odd DP value and in many cases the mixture of malto-oligosaccharides will include some dextrose (DP 1).

The malto-oligosaccharides may have a dextrose equivalent value, or DE, of any conventional value, and thus, for instance, the DE of the mixture of malto-oligosaccharides may be 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70. In some embodiments the DE of the mixture of malto-oligosaccharides may range from 3-25 and in some embodiments from 5-25. In some embodiments the mixture is a maltodextrin and in other embodiments the mixture is a syrup or syrup solid. In other embodiments the DE is less than 50. For instance, the mixture of malto-oligosaccharides may have a DE of less than 49, less than 48, less than 47, less than 46, less than 45, less than 44, less than 43, less than 42, less than 41, less than 40, less than 39, less than 38, less than 37, less than 36, less than 35, less than 34, less than 33, less than 32, less than 31, less than 30, less than 29, less than 28, less than 27, less than 26, less than 25, less than 24, less than 23, less than 22, less than 21, less than 20, less than 19, less than 18, less than 17, less than 16, less than 15, less than 14, less than 13, less than 12, less than 11, less than 10, less than 9, less than 8, less than 7, less than 6, less than 5, less than 4, or less than 3.

Further details concerning maltodextrins and applications for maltodextrins can be found in U.S. Pat. No. 7,728,125 "Reduced malto-oligosaccharides"; U.S. Pat. No. 7,595,393 "Reduced malto-oligosaccharides"; U.S. Pat. No. 7,405,293 "Reduced malto-oligosaccharides"; U.S. Pat. No. 7,265,078 "Drilling fluid apparatus and method"; U.S. Pat. No. 7,091,335 "Derivatized reduced malto-oligosaccharides"; U.S. Pat. No. 6,946,148 "Method for absorbing fluid"; U.S. Pat. No. 6,919,446 "Reduced malto-oligosaccharides"; U.S. Pat. No. 6,828,310 "Compositions including reduced malto-oligosaccharide preserving agents, and methods for preserving a material"; U.S. Pat. No. 6,806,231 "Drilling fluid, apparatus, and method"; U.S. Pat. No. 6,720,418 "Derivatized reduced malto-oligosaccharides"; U.S. Pat. No. 6,613,898 "Reduced malto-oligosaccharides"; U.S. Pat. No. 6,610,672 "Compositions including reduced malto-oligosaccharide preserving agents, and methods for preserving a material"; U.S. Pat. No. 6,593,469 "Compositions including reduced malto-oligosaccharide preserving agents"; U.S. Pat. No. 6,528,629 "Malto-oligosaccharide derived glycosides"; U.S. Pat. No. 6,518,223 "Drilling fluid, apparatus, and method"; U.S. Pat. No. 6,475,979 "Reduced malto-oligosaccharide cleansing, compositions"; U.S. Pat. No. 6,436,678 "High purity maltose process and products"; U.S. Pat. No. 6,391,293 "Lanthionizing compositions, systems, and methods"; U.S. Pat. No. 6,380,379 "Derivatized reduced malto-oligosaccharides"; and U.S. Pat. No. 6,375,798 "Derivatized malto-oligosaccharides, methods for trash scavenging, and process for preparing a paper web"; all assigned to Grain Processing Corporation of Muscatine, Iowa. Grain Processing Corporation is a commercial supplier of many food-grade malto-oligosaccharides sold under the MALTRIN® trademark. MALTRIN® malto-oligosaccharides are filtered, carbon-treated, and spray-dried products. The commercially available MALTRIN® product line covers a range of DE values from 5-25. Exemplary MALTRIN® products include MALTRIN® M040; MALTRIN® M100; MALTRIN® M150; MALTRIN® M180, and MALTRIN® QD grades M500, M510, M550, and M580.

The dissolution agent may be included in the thickener composition in any amount effective to assist in mixing of the xanthan and ascorbic acid with the food product. The dissolution agent may be not present, or may be present in amounts up to about 75% by weight. If the dissolution agent is not present, it may become necessary or desirable to shake or agitate the xanthan mixture when added to a food product. In such case, this may disrupt fats or other components of the food product, which can be undesirable. Under one approach, a powdered thickener composition may comprise between 40 percent to about 60 percent xanthan, such as about 55 percent xanthan, and between 40 percent to 60 percent of a dissolution agent, such as 45 percent, by weight, with small amounts of chelating agent and any binder. These weight percentages are on a typical as-supplied basis, it being assumed that the malto-oligosaccharide and xanthan will each include some moisture.

No other functional component are generally contemplated to be necessary in the thickener composition. In some embodiments, the thickener composition may be provided with components such as additional nutritive components, vitamins, minerals, or the like, or flavorants or colorants.

In preparing the thickener composition, the xanthan and ascorbic acid may be solid (but containing moisture) which are combined to provide a thickener composition, such as a powder, which is ready to use. For example, about 15 g of xanthan gum may be combined with about 2 mg of ascorbic acid to form a thickener combination in powdered form which is added to about 1000 mL of liquid product to provide a thickened liquid product:

| | Exemplary range (wt %) | Exemplary embodiment (wt %) |
|---|---|---|
| xanthan gum | 1 to 2% | 1.5% |
| ascorbic acid | 0.001% to 0.005% | 0.003% |
| Liquid product | 98% to 99% | 98.5% |

It is contemplated that the thickener composition may be added to a food product, such as breast milk or baby formula, in an amount sufficient to thicken the food product to a viscosity suitable for ingestion by dysphagic infants or other dysphagic patients. The viscosity suitable for ingestion will depend on the patient, but it is contemplated that the viscosity may be to about 2000 centipoise. In some cases, the viscosity may be about 275 centipoise (nectar viscosity) and in other cases about 975 centipoise (honey viscosity). In some cases, the viscosity may be about 150 centipoise, or 400 centipoise, or 900 centipoise. Unless otherwise specified, viscosities stated herein are as measured using a Brookfield Cone/Plate Viscometer DV-II$^+$. The thickener may be added in any amount by total weight relative to the food product to provide the desired viscosity. For example, the thickener composition may be added in an amount such that the xanthan gum is present in an amount of between about 1 weight percent to about 3 weight percent of the thickened breast milk by total weight.

Breast milk may be but typically is not available in prepackaged form, whereas baby formula typically is supplied in prepackaged form. In either case, as indicated hereinabove, in some embodiments it is contemplated that the thickener composition will be added to the breast milk as naturally expressed or to conventional baby formula. The mixing may take place in a hospital or other facility or the home of the infant, or at any other suitable location, and may be performed by a parent or by a medical provider or other caretaker. When added to a baby formula, any conventional baby formula or baby formula otherwise found to be suitable may be employed. The baby formula generally includes nutritive components suitable for ingestion by an infant, the nutritive components including at least one mineral selected from the group consisting of iron, calcium, and zinc. The formula may be, for example, a dairy-based formula or a soy-based formula, and may include, for example, water, milk solids (such as demineralised whey, skim milk, lactose, and/or whey), vegetable oils (such as soy oil), maltodextrin and/or lactose, other carbohydrates, and vitamins and minerals. In other embodiments the formula may include vegetable oils, corn syrup solids and maltodextrin, soy protein isolate, and an emulsifier such as soy lecithin. The baby formula may be a dry-mix formula or may be supplied in liquid form. When used with breast milk, the breast milk product may be provided by the dysphagic infant's mother, or may be from a donated source of breast milk.

In some aspects, a method for preparing a thickened baby formula or breast milk is provided. The method comprises providing a baby formula, providing a thickener composition, and adding the thickener composition to the baby formula or breast milk in an amount effective to thicken said breast milk to a viscosity suitable for ingestion by dysphagic infants. To prepare the thickened breast milk product or the baby formula product of the present disclosure, the thickener composition can be added to the breast milk or baby formula in vessels or containers such as infant feeding bottles, glasses, coffee cups, bowls, and other household containers, without or without a lid, as well as any suitably sized container which can accommodate amount of materials to be combined. The thickener composition may be in powdered form, and added to and combined with the breast milk or baby formula to prepare the thickened breast milk product or the thickened baby formula product by using utensils such as forks, spoons, knives, chopsticks, hand mixers, kitchen blenders, kitchen top mixers, whisks, and any other suitable agitation devices. Suitable mixing containers may have a lid or cover that can be attached to the container to allow the breast milk or baby formula and thickener composition to be shaken together. Mixing time for preparing the thickened breast milk product or the baby formula may be as needed to achieve the desired thickness of the product for oral ingestion. Mixing time may be up to about 5 minutes, such as between about 2 seconds to about 1.5 minutes.

In another approach, a method for providing nutrition to a dysphagic infant comprising administering a thickened breast milk or baby formula is provided. The thickened breast milk product comprises breast milk, xanthan gum, and a chelating agent as described herein.

In other aspects, a baby formula is provided. The baby formula may be a prepackaged formula or may be prepared in situ. In either case, the baby formula may contain nutritive components, xanthan gum, and a chelating agent as described hereinabove, and may contain a dissolution agent. A sealed package that contains baby formula also is encompassed by some aspects of the invention. The package may include a dry-mix formula or may include a ready-to-drink formula. If a dry-mix formula, the formula may include xanthan and a chelating agent, or the package may include discrete areas for the thickener composition and for the formula if it is desired to allow the consumer or caretaker to blend the formula in situ to the desired thickness. When preparing a formula from water, the formula, and the thickener composition, these ingredients may be blended in any suitable order.

While much of the above described with respect to breast milk and baby formula, it should be understood that the invention is not limited thereto unless otherwise expressly claimed. For example, the thickener composition is deemed to be useful in conjunction with thickening cow's milk for consumption by dysphagic adults.

EXAMPLES

The following examples and comparative examples are provided to illustrate certain embodiments of the invention, but should not be construed as limiting the invention in scope.

Baseline Determination of Calcium, Zinc, and Iron

Milk samples from infant formula (SIMILAC® NEO-SURE®, Abbott Laboratories, Abbott Park, Ill.) and human breast milk were prepared. Six piglets were fed with a 5% glucose solution in deionized water ad libitum for 36 hours prior to the administration of the milk samples to the test subjects to flush minerals from the blood stream and achieve homeostasis. At the end of the 36 hours of glucose feeding, three of the six piglets were provided with non-thickened infant formula, and the remaining three were provided with non-thickened human breast milk. The samples were provided to each test subject ad libitum for about 48 hours. At the end of 48 hours, approximately 2 ml of blood was drawn from the test subjects and analyzed for calcium, iron, and zinc levels in accordance with the methods described in Miller-Ihli, "Trace element determinations in foods and biological samples using inductively coupled plasma atomic emission spectrometry and flame atomic absorption spectrometry," J. Agr & Food Chem. 44:9 (1996). The average values were calculated and are shown in the table below.

| Milk Type | Iron (mg/L) | Calcium (mg/L) | Zn (mg/L) |
|---|---|---|---|
| Formula | 0.071 | 30.50 | 1.05 |
| Breast Milk | 0.065 | 28.45 | 1.14 |

The above results in were obtained from calculations based on test subject data show in the table below.

| | Piglet I.D | Fe (mg/L) | Ca (mg/L) | Zn (mg/L) |
|---|---|---|---|---|
| Baseline Group Formula | B-007 | 0.075 | 30.21 | 1.02 |
| | B-010 | 0.071 | 31.02 | 1.05 |
| | B-011 | 0.068 | 30.27 | 1.07 |
| | Average | 0.071 | 30.50 | 1.05 |
| Baseline Group Breast Milk | B-014 | 0.068 | 28.1 | 1.12 |
| | B-028 | 0.063 | 29.07 | 1.09 |
| | B-032 | 0.064 | 28.19 | 1.21 |
| | Average | 0.065 | 28.45 | 1.14 |

Example 1 and Comparative Example 1

Test subjects provided with xanthan only thickened formula or breast milk, and test subject provided with xanthan and ascorbic acid thickened formula or breast milk. Prior to providing test subject with xanthan only thickened formula or breast milk, and with xanthan and ascorbic acid thickened formula or breast milk, test subjects were fed with a 5% glucose solution as described in Comparative Example 1, and provided with the milk samples ad libitum for about 48 hours.

Samples of xanthan only thickened formula or breast milk, and xanthan and ascorbic acid thickened formula or breast milk were prepared in amounts as shown in the table below:

| Comparative Example 1 Xanthan Thickened Milk | | Example 1 Xanthan and Ascorbic Acid Thickened Milk | |
|---|---|---|---|
| Xanthan | 1.5% | Xanthan | 1.5% |
| Ascorbic Acid | — | Ascorbic Acid | 0.002% |
| Milk (Formula or Breast Milk) | 98.5% | Milk (Formula or Breast Milk) | ~98.5% |

Of twelve test subjects, six test subjects were provided with xanthan thickened formula, and the remaining six were provided with xanthan thickened breast milk. Blood levels of iron, calcium, and zinc for tests subjects provided with xanthan thickened milk were obtained as described above.

The same tests subjects administered xanthan thickened formulas were administered xanthan and ascorbic acid thickened formula on a separate occasion. The same tests subjects given xanthan thickened breast milk were administered xanthan and ascorbic acid thickened breast milk on a separate occasion. Blood levels of iron, calcium, and zinc for tests subjects provided with xanthan and ascorbic acid thickened milk were obtained as described in Comparative Example 1 above.

Average blood levels of iron, calcium, and zinc were calculated for the thickened formula with results as shown in the table below:

Thickened Formula

Comparison of Blood Mineral Levels (mg/L) Between Xanthan Thickened Formula and Xanthan and Ascorbic Acid Thickened Formula

| Mineral Type | Xanthan Thickened Formula (Comparative Example 1) | Xanthan and Ascorbic Acid Thickened Formula (Example 1) | Percent Increase |
|---|---|---|---|
| Iron | 0.043 | 0.066 | 53.5 |
| Calcium | 27.53 | 30 | 9.0 |
| Zinc | 0.95 | 1.04 | 9.5 |

The above results were obtained from calculations based on test subject data show in the table below:

| | Piglet I.D | Fe (mg/L) | Ca (mg/L) | Zn (mg/L) |
|---|---|---|---|---|
| Test Subjects Fed Xanthan Thickened Formula | B-072 | 0.046 | 28.28 | 0.96 |
| | B-021 | 0.051 | 27.89 | 0.96 |
| | B-061 | 0.039 | 27.27 | 0.93 |
| | B-111 | 0.041 | 27.32 | 0.89 |
| | B-098 | 0.038 | 28.09 | 1.01 |
| | B-025 | 0.042 | 26.32 | 0.93 |
| | Average | 0.043 | 27.53 | 0.95 |
| Test Subjects Fed Xanthan and Ascorbic Acid Thickened Formula | B-072 | 0.071 | 29.07 | 0.98 |
| | B-021 | 0.068 | 30.08 | 1 |
| | B-061 | 0.065 | 29.45 | 0.99 |
| | B-111 | 0.062 | 29.9 | 1.01 |
| | B-098 | 0.07 | 30.8 | 1.1 |
| | B-025 | 0.059 | 30.71 | 1.14 |
| | Average | 0.066 | 30.00 | 1.04 |

Similar results were obtained for the thickened breast milk as shown in the table below:

Comparison of Blood Mineral Levels (mg/L) Between Xanthan Thickened Breast Milk and Xanthan and Ascorbic Acid Thickened Breast Milk

| Mineral Type | Xanthan Thickened Breast Milk (Example 1) | Xanthan and Ascorbic Acid Thickened Breast Milk (Example 1) | Percent Increase |
|---|---|---|---|
| Iron | 0.049 | 0.071 | 44.9 |
| Calcium | 25.63 | 28.37 | 10.7 |
| Zinc | 0.85 | 0.96 | 12.9 |

The above results were obtained from calculations based on test subject data show in the table below.

| | Piglet I.D | Fe (mg/L) | Ca (mg/L) | Zn (mg/L) |
|---|---|---|---|---|
| Test Subjects Fed Xanthan Thickened Formula | B-017 | 0.049 | 22.8 | 0.92 |
| | B-029 | 0.045 | 25.34 | 0.95 |
| | B-053 | 0.051 | 26.79 | 0.82 |
| | B-042 | 0.053 | 25.67 | 0.85 |
| | B-050 | 0.048 | 26.05 | 0.83 |
| | B-038 | 0.048 | 27.14 | 0.75 |
| | Average | 0.049 | 25.63 | 0.85 |
| Test Subjects Fed Xanthan and Ascorbic Acid Thickened Formula | B-017 | 0.066 | 28.22 | 0.98 |
| | B-029 | 0.069 | 28.95 | 0.94 |
| | B-053 | 0.076 | 29.82 | 0.96 |
| | B-042 | 0.073 | 28.09 | 1.04 |
| | B-050 | 0.062 | 27.22 | 0.92 |
| | B-038 | 0.078 | 27.89 | 0.89 |
| | Average | 0.071 | 28.37 | 0.96 |

The above results demonstrate that, in comparison to baseline levels of minerals in the bloodstream from administering un-thickened infant formula and un-thickened breast milk in Comparative Example 1, bloodstream mineral levels of infant formula and breast milk thickened with xanthan are less than baseline levels, indicating that the minerals and likely binding to xanthan, resulting in decreased levels in the bloodstream. The use of ascorbic acid results in improved bioavailability of calcium, iron, and zinc over infant formula and breast milk thickened only with xanthan.

A comparison between average baseline mineral levels from Comparative Example 1 and average mineral levels resulting from milk thickened with xanthan only is presented in the table below.

Comparison of Baseline Blood Mineral Levels and Xanthan Thickened Milk

| Xanthan Thickened Formula | | | | Xanthan Thickened Breast Milk | | | |
|---|---|---|---|---|---|---|---|
| | Fe | Ca | Zn | | Fe | Ca | Zn |
| Baseline Level (mg/L) | 0.071 | 30.50 | 1.05 | Baseline Level (mg/L) | 0.065 | 28.45 | 1.14 |
| Xanthan Thickened Formula Level (mg/L) | 0.043 | 27.53 | 0.95 | Xanthan Thickened Breast Milk Level (mg/L) | 0.049 | 25.63 | 0.85 |
| Difference (mg/L) | 0.028 | 2.97 | 0.1 | Difference (mg/L) | 0.016 | 2.82 | 0.29 |
| Percent Difference | 39.4 | 9.7 | 9.5 | Percent Difference | 24.6 | 9.9 | 25.1 |

In comparison to baseline levels of minerals in the bloodstream from administering un-thickened infant formula and un-thickened breast milk in Comparative Example 1, bloodstream mineral levels of infant formula and breast milk thickened with xanthan and ascorbic acid are closer to baseline levels.

A comparison between average baseline mineral levels from Comparative Example 1 and average mineral levels resulting from milk thickened with xanthan and ascorbic acid is presented in the table below.

Comparison of Baseline Blood Mineral Levels and Xanthan and Ascorbic Acid Thickened Milk

| Xanthan and Ascorbic Acid Thickened Formula | | | | Xanthan and Ascorbic Acid Thickened Breast Milk | | | |
|---|---|---|---|---|---|---|---|
| | Fe | Ca | Zn | | Fe | Ca | Zn |
| Baseline Level (mg/L) | 0.071 | 30.5 | 1.05 | Baseline Level (mg/L) | 0.065 | 28.45 | 1.14 |
| Xanthan + Ascorbic Acid Thickened Formula Level (mg/L) | 0.066 | 30.0 | 1.04 | Xanthan + Ascorbic Acid Thickened Breast Milk Level (mg/L) | 0.071 | 28.37 | 0.96 |
| Difference (mg/L) | 0.005 | 0.5 | 0.01 | Difference (mg/L) | −0.006 | 0.09 | 0.19 |
| Percent Difference | 7.71 | 1.63 | 0.96 | Percent Difference | −8.7 | 0.31 | 16.23 |

Compared to baseline levels, xanthan-only thickened milk resulted in a decreased availability of Fe, Ca, and Zn, which is believed to be indicative of binding of Fe, Ca, and Zn to xanthan. Xanthan- and ascorbic-acid-thickened milk resulted in availability levels much closer to baseline levels, which is believed to be indicative of ascorbic acid intervening with binding of Fe, Ca, and Zn to xanthan. The −8.7 value for iron indicates that more iron was bioavailable in the thickened milk than in the unthickened milk, and this is believed to be due to a reduction of $Fe^{3+}$ or other iron in the milk.

Example 2

A powdered thickener composition is prepared by combining xanthan gum, ascorbic acid, and maltodextrin in the amounts listed in the table below:

Thickener Composition

| Ingredient | Wt % |
|---|---|
| Xanthan Gum | 55% |
| Ascorbic Acid | 0.07% |
| Maltodextrin | 45% |

These ingredients are combined in a mixer and mixed until the components are evenly distributed.

Example 3

A thickened breast milk product is prepared by combining 5.5 g of the thickener composition of Example 2 with 200 mL of breast milk. The thickened breast milk product has a composition as shown in the table below.

Thickened Breast Milk Product

| Component | Wt % |
|---|---|
| Xanthan Gum | 1.5% |
| Ascorbic Acid | 0.002% |
| Maltodextrin | 1.2% |
| Breast Milk | 97.3% |

The thickener composition is added to a feeding bottle containing 200 mL of breast milk. The contents of the feeding bottle are then agitated by shaking for about 10 seconds until the thickener composition has dispersed and the contents are thickened.

Example 4

A baby formula product is prepared by combining 35.2 grams of ENFAMIL PREMIUM® Infant (Mead Johnson & Company, LLC) and 250 mL of water according to label instructions, and 8 g of the thickener composition of Example 2. The thickened baby formula product has a composition as shown in the table below.

Thickened Baby Formula Product

| Component | Wt % |
|---|---|
| Xanthan Gum | 1.5% |
| Ascorbic Acid | 0.002% |
| Maltodextrin | 1.2% |
| ENFAMIL PREMIUM ® Infant | 12.0% |
| Water | 85.3% |

Baby formula and the thickener composition are combined into an empty feeding bottle. Water is added to the feeding bottle. The contents of the feeding bottle are then agitated by stirring with a spoon for about 20 seconds until the powdered components are evenly dispersed and the baby formula is thickened.

Example 5

To provide breast milk or baby formula to an infant with dysphagia, the thickened breast milk product of Example 3 or baby formula of Example 4 is administered to an infant with dysphagia. The thickened breast milk is thickened to have a viscosity of between 100 to 1000 centipoise.

Except as otherwise clearly indicated by context, all weight percentages expressed herein are on a dry solids basis.

All references cited herein are hereby incorporated by reference in their entireties.

Uses of singular terms such as “a,” “an,” are intended to cover both the singular and the plural, unless otherwise indicated herein or clearly contradicted by context. The terms “comprising,” “having,” “including,” and “containing” are to be construed as open-ended terms. Any description of certain embodiments as “preferred” embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

[1. A thickened breast milk product comprising:

breast milk;

xanthan gum, said xanthan gum being present in an amount from 1 to 2% by weight and a chelating agent comprising ascorbic acid from 0.001% to 0.005% by weight, to increase the bioavailability of at least one mineral selected from the group consisting of iron, zinc, and calcium relative to the absence of the chelating agent;

wherein the ratio by dry weight of xanthan gum to ascorbic acid is between about 2000:1.5 to about 1000:2.5.]

[2. The thickened breast milk product of claim 1, wherein the xanthan is present in an amount sufficient to thicken the breast milk to a viscosity of between about 100-1000 centipoise.]

[3. The thickened breast milk product of claim 1, wherein the bioavailability of calcium in said thickened breast milk product is at least about 80 percent of the bioavailability of calcium of unthickened breast milk.]

[4. The thickened breast milk product of claim 1, wherein the bioavailability of iron in said thickened breast milk product is at least about 80 percent of the bioavailability of iron of unthickened breast milk.]

[5. The thickened breast milk product of claim 1, wherein the bioavailability of zinc in said thickened breast milk product is at least about 80 percent of the bioavailability of the zinc of unthickened breast milk.]

[6. The thickened breast milk product of claim 1, wherein the chelating agent is ascorbic acid; wherein the xanthan is present in an amount sufficient to thicken the breast milk to a viscosity of between about 100-1000 centipoise; wherein the bioavailability of calcium in said thickened breast milk product is at least about 80 percent of the bioavailability of calcium of unthickened breast milk; wherein the bioavailability of iron in said thickened breast milk product is at least about 80 percent of the bioavailability of iron of unthickened breast milk; and wherein the bioavailability of zinc in said thickened breast milk product is at least about 80 percent of the bioavailability of the zinc of unthickened breast milk.]

*7. A thickened food product made by a method comprising:*

*mixing a food product and a thickener composition in a ratio effective to thicken said food product;*

*said food product comprising at least one of calcium, zinc, or iron;*

*said thickener composition comprising xanthan gum, said xanthan gum being present in an amount from 1 to 2% by weight, blended with a chelating agent, said chelating agent comprising ascorbic acid from 0.001% to 0.005% by weight;*

*wherein the ratio by dry weight of xanthan gum to ascorbic acid is between about 2000:1.5 to about 1000:2.5;*

*said thickener added in an amount to provide an amount of chelating agent effective to increase the bioavailability to a dysphagic consumer of at least one of calcium, zinc, or iron relative to the absence of the chelating agent,*

*wherein the amount of thickener added thickens the food product to a viscosity of about 150 centipoise to about 2000 centipoise,*

*wherein the thickening composition comprises 40-60 wt. % xanthan gum and 40-60% dissolution agent.*

*8. The thickened food product of claim 7, wherein the bioavailability of calcium in said thickened food product is at least about 80 percent of the bioavailability of calcium in the food product without the xanthan gum and the chelating agent.*

*9. The thickened food product of claim 7, wherein the bioavailability of iron in said thickened food product is at least about 80 percent of the bioavailability of iron in the food product without the xanthan gum and the chelating agent.*

*10. The thickened food product of claim 7, wherein the bioavailability of zinc in said thickened food product is at least about 80 percent of the bioavailability of zinc in the food product without the xanthan gum and the chelating agent.*

*11. The thickened food product of claim 7, wherein the food product comprises water.*

*12. The thickened food product of claim 7, wherein the food product comprises vegetable oil.*

*13. The thickened food product of claim 7, wherein the food product comprises milk.*

*14. The thickened food product of claim 7, wherein the thickener composition further includes a dissolution agent.*

*15. The thickened food product of claim 7, wherein the thickening composition comprises 40-60 wt. % xanthan gum and 40-60% dissolution agent.*

*16. The thickened food product of claim 15, wherein the dissolution agent is maltodextrin.*

* * * * *